United States Patent
Bennington, II et al.

(10) Patent No.: US 8,695,804 B2
(45) Date of Patent: Apr. 15, 2014

(54) SAND DEWATERING DEVICE AND METHOD

(75) Inventors: William John Bennington, II, Columbus, NE (US); Brian Robert Beck, Humphrey, NE (US)

(73) Assignee: Greystone, Inc., Columbus, NE (US)

( * ) Notice: Subject to any disclaimer, the term of this patent is extended or adjusted under 35 U.S.C. 154(b) by 1801 days.

(21) Appl. No.: 11/849,626

(22) Filed: Sep. 4, 2007

(65) Prior Publication Data

US 2009/0057204 A1 Mar. 5, 2009

(51) Int. Cl.
*B07B 1/22* (2006.01)

(52) U.S. Cl.
USPC .......................... 209/270; 209/913

(58) Field of Classification Search
USPC .................. 209/270, 284, 293, 406, 913
See application file for complete search history.

(56) References Cited

U.S. PATENT DOCUMENTS

| | | | |
|---|---|---|---|
| 3,398,676 A | 8/1968 | Theobald et al. | |
| 3,970,549 A | 7/1976 | Ennis et al. | |
| 4,100,248 A | 7/1978 | Adams | |
| 4,113,626 A | 9/1978 | Detcher | |
| 5,516,427 A * | 5/1996 | Yoshikawa | 210/413 |
| 5,552,044 A * | 9/1996 | Abel | 210/252 |
| 6,168,102 B1 * | 1/2001 | Bergart | 241/99 |
| 6,325,311 B1 | 12/2001 | Preisser | |

FOREIGN PATENT DOCUMENTS

| | | |
|---|---|---|
| DE | G 93 11 011 U1 | 10/1993 |
| DE | 43 14 673 C1 | 5/1994 |
| DE | 10 2005 019243 A1 | 11/2006 |
| WO | WO 2004/047548 A1 | 6/2004 |

OTHER PUBLICATIONS

GreyStone brochure "Dewatering Screens", "Single-Deck Twin Vibrator, Select from 3 Models: DS-488, DS-6010, DS-7212", 8 pages, Mar. 2004, www.greystoneinc.com.
GreyStone brochure "Wash a broader range of spec aggregate product." "Fine Material Dewatering Screws" "Both Single & Twin Models", 2003, 8 pages, www.greystoneinc.com.
International Search Report, PCT/US2008/051565, Greystone, Inc., Jan. 21, 2008, 5 pages.

\* cited by examiner

*Primary Examiner* — Joseph C Rodriguez
*Assistant Examiner* — Kalyanavenkateshware Kumar
(74) *Attorney, Agent, or Firm* — McKee, Voorhees & Sease, P.L.C.

(57) ABSTRACT

A dewatering device for aggregate products such as sand and gravel to allow dewatering to a moisture within the range of 8% by weight. This energy efficient dewatering system uses an inclined rotatably mounted dewatering screw to initially dewater, followed by an associated vibratory dewatering screen to achieve combined results that neither an inclined dewatering screw or a vibratory screen can achieve separately.

10 Claims, 3 Drawing Sheets

SAND DEWATERING DEVICE AND METHOD

FIELD OF THE INVENTION

The present invention relates to an apparatus for dewatering aggregate, commonly referred to as sand and gravel. It may of course be used for dewatering other materials, such as ore and minerals.

BACKGROUND OF THE INVENTION

In the processing and handling of aggregate materials such as sand, gravel or crushed stone, as well as in related industrial materials like coal, slag, iron ore, phosphate, potash, primary metal and related chemical industries, it is necessary to utilize relatively large quantities of water or other liquids in conjunction with or as a dispersing medium for finely sized solid particles produced in the respective grading, concentration or other process. At some point in the process, it is usually necessary to subsequently effect a separation or dewatering of these fine solid materials from the slurry containing them.

One method of dewatering fine granular material prior to disposing of the waste water or other liquid has been to subject the mixture to suitable dewatering devices. The most widely employed method for dewatering in the mineral aggregates industry is an inclined screw dehydrator which slowly moves the solid material up the incline of the screw thread out of a feed basin permitting back flow of the water to waste. However, such equipment has limited water handling capacity and is plagued by the loss of valuable fines which are carried away in the back flow. Also, while such equipment only consumes an amount of energy, typically of 15 horsepower to dry 100 ton per hour to a level of 20% by weight to 25% by weight moisture, the moisture level remains high.

Another technique involves the use of centrifugal force to remove the free moisture. However, the high cost, high power consumption, and wear characteristics associated with such a centrifuge apparatus have prevented the wide use of that technique on a commercial basis for handling abrasive materials. Similarly, the use of pressure or vacuum filters has not been commercially attractive, particularly for the sand and gravel and crushed stone industries.

Another common technique employed for dewatering fine particle slurries is the use of vibrating dewatering screens. The deck of these screens have often taken the form of finely woven wire cloth through which material may pass. Some have in recent times used urethane decks with small openings for water to pass. However the typical horsepower consumption of a dewatering screen system is high, i.e., 85 horsepower per 100 ton per hour, to achieve a moisture level of 8% by weight to 13% by weight; the typical vibratory dewatering screw, while it does dry to levels of moisture of from 8% by weight to 13% by weight, uses an 85 horsepower per 100 ton per hour power consumption. Moisture content may vary by particle size and mineral composition. The assignee of the current application manufactures both conventional dewatering screws and dewatering screens. As discussed, both have deficiencies, either high residual moisture or high power consumption to achieve low moisture.

As can be appreciated, the industry is constantly seeking improved methods for dewatering large quantities of fine solid slurries, particularly sand and gravel but not exclusively sand and gravel. Moreover, the industry is also seeking this improvement in ways which decrease moisture level efficiently with minimum power consumption.

Accordingly, it is a principle object of the present invention to provide a new and improved dewatering device which combines the advantages of an inclined rotatable screw and a vibratory dewatering screen, each designed so that they will cooperate together, i.e., co-act and provide a new and improved dewatering system that substantially increases the efficiency of the dewatering operation to achieve low moisture levels at lower power consumption cost.

Another object of the present invention is to provide a method of dewatering which achieves the above objective without the need of employing impractical and cost inefficient techniques such as centrifugal apparatus, pressure or vacuum filters, etc. The present device and method is uniquely suited, particularly for the sand and gravel and crushed stone industry, to provide lower cost effective dewatering.

A better understanding of the objects, advantages, features, properties and relationships of the component parts and the entirety of the invention will be obtained from the following detailed description and accompanying drawings which set forth an illustrative preferred embodiment and are indicative of the way in which the principles of the invention can be employed.

BRIEF SUMMARY OF THE INVENTION

A dewatering device for aggregate products such as sand and gravel and ore and minerals, to allow dewatering to a moisture within the range of 8% by weight to 13% by weight at the rate of 100 tons per hour utilizing only 30 horsepower. This energy efficient dewatering system uses an inclined rotatably mounted dewatering screw to initially dewater, followed by an associated vibratory dewatering screen to achieve combined results that neither an inclined dewatering screw or a vibratory screen can achieve separately.

DETAILED DESCRIPTION OF THE PREFERRED EMBODIMENT

Figure 1:
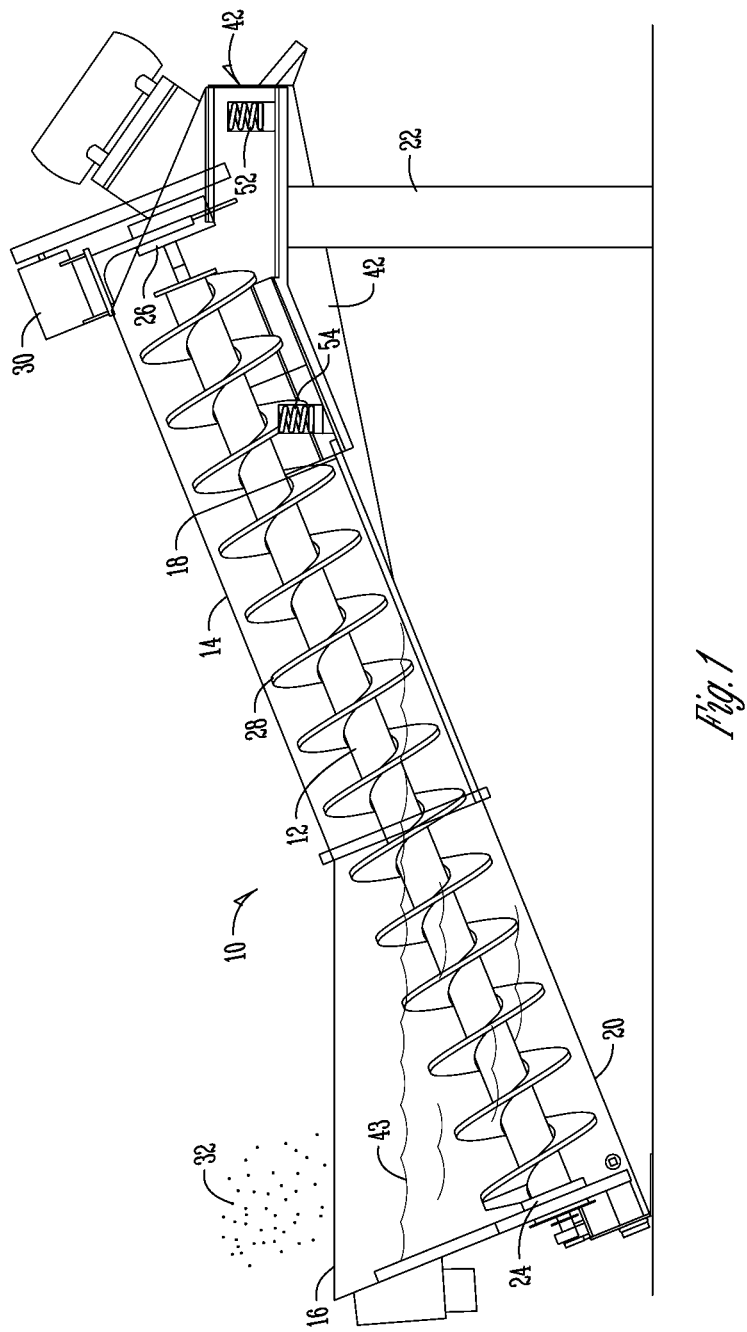
FIG. 1 is a schematic of a side view of the dewatering device.

Referring now to the drawings in greater detail wherein like reference numerals indicate like parts throughout the several figures. The device or unit is referred to generally as 10.

FIG. 1 is a schematic with parts broken away of a side view of the dewatering device 10 utilizing the features of the present invention. The dewatering device 10 is suitable for dewatering aggregate product, i.e., sand and gravel but may be used for dewatering other products such as minerals, ores, etc. Those of ordinary skill in the art appreciate this wider use and need no further description of alternative substrates with which this device may be used. As shown in FIG. 1, the device 10 includes an inclined dewatering screw 12 contained within a housing 14 having a lower or entrance end 16 and bottom 20. The dewatering screw 12 is mounted on an incline within the housing, which is supported in its inclined position by legs 22.

Inclined dewatering screw 12 is rotatably mounted in conventional fashion at 24, 26. The dewatering screw flights 28 may have holes for bolts to hold an abrasion resistant liner (not depicted). At its upper end, dewatering screw 12 is operatively connected to motor 30 to allow rotational operation of dewatering screw 12. Motor 30 can vary in horsepower but generally is from 15 to 50. Housing 14 is open at 16 for entrance of sand and gravel 32, which drops to auger or dewatering screw 12.

In operation, sand and gravel 32 is delivered via opening 16 into the lower entrance end 16 wherein it falls to the bottom 20. Electric motor 30 operates to rotate dewatering screw 12 to convey sand and gravel 32 up the incline of the dewatering screw 12 via flights 28. Of course, the water drains back down as illustrated at water level 32 as the aggregate is conveyed up the incline.

Certain constructional features of the dewatering screw device 10 are worthy of mention for this importance of the combined unit. As earlier indicated, the motor 30 can have a horsepower within the range of from 15 to 50. The length of the dewatering screw 12 can vary but will generally be within the range from 20 feet to 35 feet with lengths at the shorter end of the range being most preferred. The angle of the inclined dewatering screw 12 can vary from about 15° above level to about 25° above level with 18° above level being most preferred for the incline.

The uniqueness of the combination of the present invention resides in the construction of the unit at the upper end or exit end 18 of housing 14 which allows the co-action of the dewatering screw portion and the vibratory screen portion.

Figure 2:
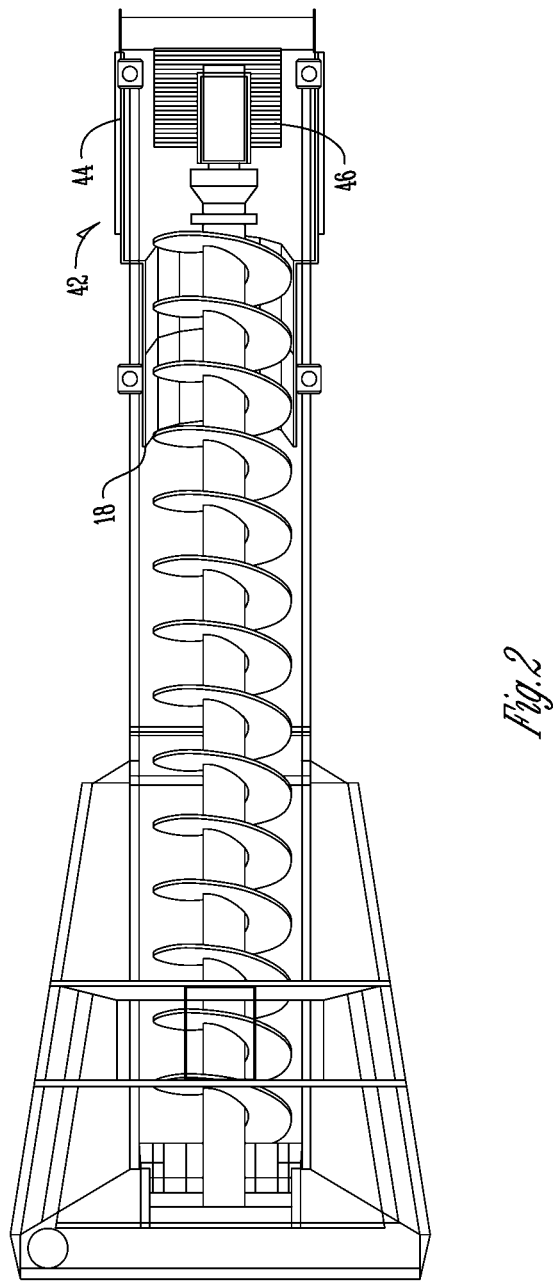
FIG. 2 is a plan view of the device of FIG. 1.
Figure 3:
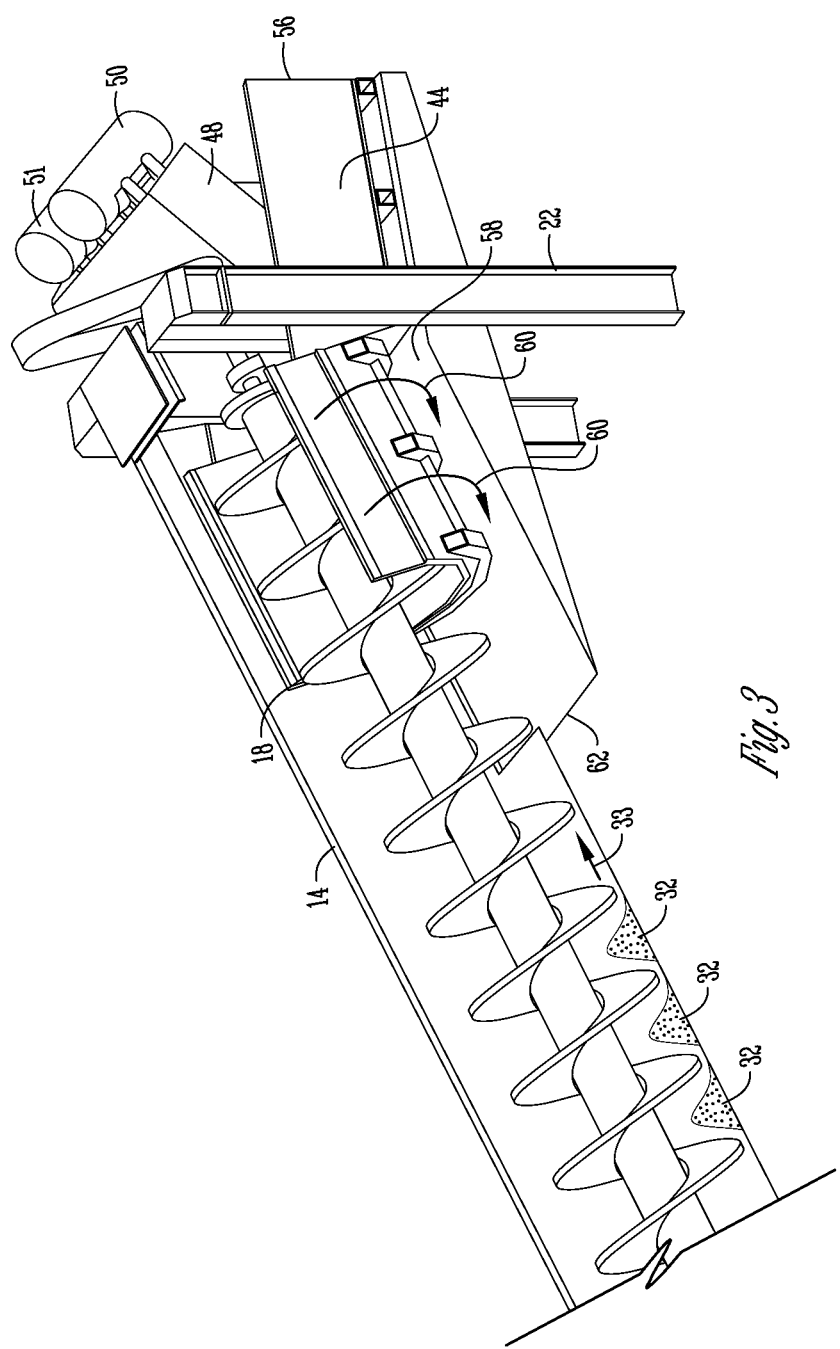
FIG. 3 is a perspective view of the exit end of the dewatering screw at the entrance to the vibratory dewatering screen.

The configuration of the exit end 18 of screw housing 14 and the beginning into vibratory portion 42 of the overall device 10 is best illustrated in FIGS. 2 and 3. At its exit end 18 screw housing 14 is welded to the horizontal housing of vibratory portion 42 to define the entrance to the vibratory housing 44. Screen 46 is mounted for linear and horizontal movement within vibratory housing 44. Motor mount 48 is mounted at its lower end to screen 46 and at its upper end to vibratory motors 50, 51. Coil springs 52, 54 are mounted to vibratory housing 44 and vibratory screen 46 to allow dewatering screen unit to vibrate when vibratory motors 50, 51 operate to initiate a linear and horizontal motion, moving the sand and gravel 32 whole particles towards the exit end 56 to further dewater. The vibratory screen 46 may utilize a urethane deck with ¼ mm apertures to allow the user to dewater a broad range of particle sizes. Depending on the application, the opening can be up to 1 mm. The deck can handle up to approximately 14 inches of material depth, making use of the bottom layer material as a filter media. The dewatering screen may be constructed of high quality ASTM A36 structural steel.

The bed of the screen 46 has two angles. At the beginning it parallels the dewatering screw 12, but the end at the discharge point is horizontal. Dry sand and gravel moves out the exit 56 after the vibratory shaking of screen 46 caused by motors 50, 51. Motion or vibration is supported by springs 52, 54.

Material that comes through the ¼ mm screen 46 along with the water is collected in an under screen pan called an underflume 58. This water and fine sand mixture flows down hill (arrows 60) along the underflume 58 to its lowest end 62. At this point there is a gap in the tub around the dewatering screw 14. This sand and water flows back into the area of the dewatering screw. The water will overflow the back end of the washer and the fine sand will be pushed by the screw back onto the dewatering screen 46. The excess water flows out the back end of the screen via the belly pan (at 62).

The recycle of fine sand and gravel 32 which has traveled via directional arrow 33 (FIG. 3) up inclined screw 12 via its flights 28 and into vibratory screen 46, followed by fines dropping through underflume 58, via directional arrows 60 so that it is pushed back to the dewatering screw 12 for recycle back along the direction of arrow 33 is unique, and allows for the increased efficiency that exceeds that of a dewatering screw alone or a vibratory screen alone. As a result, energy efficiency and dewatering levels never before achieved with either device alone or simply added together in seriation are achieved.

Certain constructional features of the dewatering device portion 42 are worthy of mention. Dual vibratory motors 50, 51 can easily be set to increase vibratory intensity resulting in higher production and drier product if desired. Put another way, they are adjustable for the amount of acceleration desired. Generally 7.5 horsepower motors are satisfactory to provide this "g" force. The larger the screen 46, the greater the force required. The deck or vibratory screen size 46 can vary in width and length. When used in combination with the dewatering screw portion 12 of the device 10 together they co-act to achieve from 8% by weight to 13% by weight dryness (comparable to dewatering screens) but at a much lower horsepower consumption than a dewatering screen system alone or a dewatering screw alone, i.e., successful operation can regularly be achieved at an average of 30 horsepower consumption per hour per 100 ton to achieve moisture levels of 8% by weight to 13% by weight. This has heretofore not been achievable at such low power consumption costs.

Moreover, it is important to realize that these results are achieved without the use of energy consuming pumps which have the disadvantage of increased energy consumption and wear to parts due to the high abrasion wear and tear caused by sand and gravel aggregate to the pumps. It is also important to note that the preferred screen used in the dewatering screen 46 is a two direction screen, meaning for a portion of its length at the beginning of the screen, it is parallel to the auger shaft. At approximately ⅓ of the way along, the screen bed becomes horizontal. Thus, achieving it's most efficient angle.

It is not known why this total unit 10 operates more efficiently than either portion alone, but it is believed to be the result of the unique arrangement of the exit end of the dewatering screw and entrance to the dewatering screen, namely use of the correct operating parameters including inclination angle of the dewatering screw, and its free association with the entrance end of the vibratory dewatering screen followed by the earlier described recycle. It is more efficient, due to the unique idea of reintroducing the minus 25 mm material that escapes through the urethane screen cloth. This material is reintroduced to the dewatering screw just below the water line. This eliminates the need for expensive and energy intensive pumps and cyclones, closing the circuit.

Of course, we do not wish to be bound by the theory here presented, but it is set forth as one scientific explanation for the unique co-action here described to achieve the results here demonstrated.

Of course, once the sand and gravel 32 have been separated from the water 43, it can be placed into storage or immediately used, whichever is preferred or needed.

It is to be understood that the present invention is not limited by the preferred embodiment described above but encompasses the concept generically and all embodiments including those associated in the doctrine of equivalents if the law allows for falling within the scope of the following claims. The terms used herein are used without special meaning and are intended to encompass their plain ordinary language meaning of the words to one of skill in the art.

What is claimed is:
1. A dewatering device for aggregate product, comprising:
a housing having an entrance end and an exit and;
an inclined dewatering screw rotatably mounted with said housing, and positioned below said entrance end; and a vibrator dewatering screen having an entrance and mounted with said housing adjacent said exit end of said housing for receipt of aggregate product that has passed through said dewatering screw;

said dewatering screw having an associated recycle system to recycle fines that have passed through the vibratory dewatering screen back to the dewatering screw; and a vibrator motor or motors, mounted to linearly and horizontally move said dewatering screen.

2. The device of claim 1 which includes an exit and associated with said vibrator dewatering screen for exit of dewatered aggregate.

3. The device of claim 1 wherein the dewatering screen is a two directional screen so that the initial pass through material can be reintroduced to the dewatering screw.

4. The device of claim 1 wherein the aggregate product that leaves said dewatering screw is sand and has a moisture content of 15% by weight to 25% by weight.

5. The device of claim 4 wherein the aggregate product leaving the dewatering screen has a moisture content of from about 8% by weight to about 13% by weight.

6. The dewatering device of claim 5 wherein the dewatering screw is from about 20 feet in length to about 35 feet in length.

7. The dewatering device of claim 5 wherein the dewatering screen is from about 6 foot in length to about 12 foot in length.

8. The dewatering device of claim 1 wherein the dewatering screw is mounted at an angle of from 15° to 25° above horizontal.

9. The dewatering device of claim 8 wherein the dewatering screw is mounted at 18° above horizontal.

10. The device of claim 1 which uses 30 horsepower to dewater 100 tons of aggregate/hour to a moisture level of from about 8% by weight to about 13% by weight.

* * * * *